No. 765,014. PATENTED JULY 12, 1904.
M. E. KINTZ.
WAIST SKIRT PIN AND GARMENT SUPPORTER.
APPLICATION FILED FEB. 12, 1903.
NO MODEL. 2 SHEETS—SHEET 1.

WITNESSES:
S. F. Bullard
J. C. Parker

Mary E. Kintz, INVENTOR.
BY G. W. Bullard
ATTORNEY.

No. 765,014. PATENTED JULY 12, 1904.
M. E. KINTZ.
WAIST SKIRT PIN AND GARMENT SUPPORTER.
APPLICATION FILED FEB. 12, 1903.
NO MODEL. 2 SHEETS—SHEET 2.
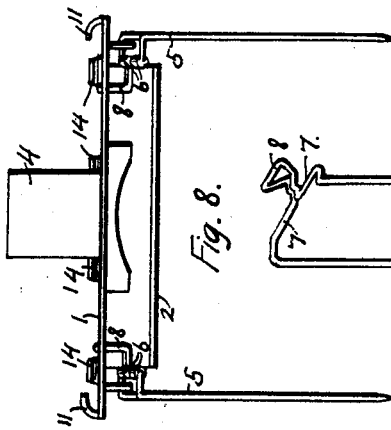
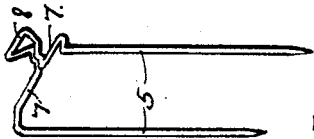
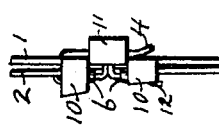
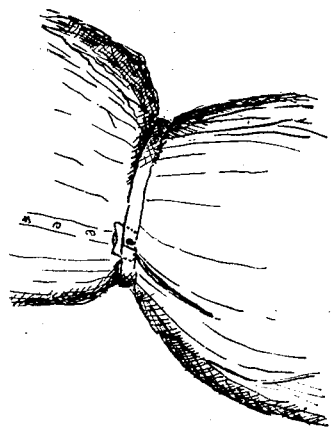
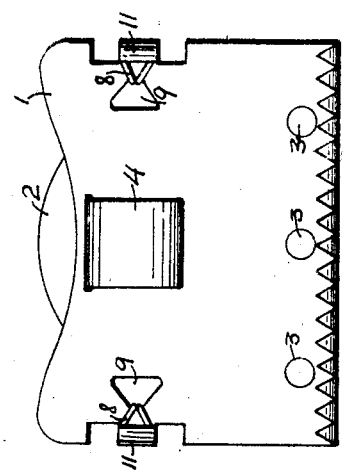
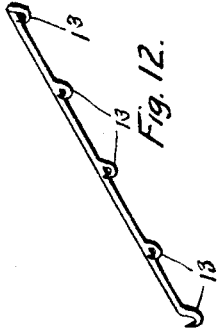
WITNESSES: Mary E. Kintz, INVENTOR:
S. A. Bullard
J. C. Parker BY G. W. Bullard.
ATTORNEY No. 765,014.

Patented July 12, 1904.

UNITED STATES PATENT OFFICE.

MARY E. KINTZ, OF TACOMA, WASHINGTON.

WAIST SKIRT-PIN AND GARMENT-SUPPORTER.

SPECIFICATION forming part of Letters Patent No. 765,014, dated July 12, 1904.

Application filed February 12, 1903. Serial No. 143,086. (No model.)

*To all whom it may concern:*

Be it known that I, MARY E. KINTZ, a citizen of the United States, residing at the city of Tacoma, in the county of Pierce and State of Washington, have invented certain new and useful Improvements in Waist Skirt-Pins and Garment-Supporters, of which the following is a specification.

My invention pertains to women's waist-pins and garment-supporters whereby the dress-skirt worn in connection therewith is fastened to and supported properly on the waist.

The objects of my invention are, first, to provide a waist-pin that can be securely attached to the waist and waist-garments without injury to the same; second, to provide a pin that when so fastened to the waist the dress-skirt can be securely hung and supported thereon when fitted to the person, and, third, to provide a waist-pin that will not only support the skirt on the waist, but will also maintain a proper position of waist and skirt band both in the front and the rear of the garments.

I attain the objects by means of the device illustrated in the accompanying drawings, in which—

Figure 3:
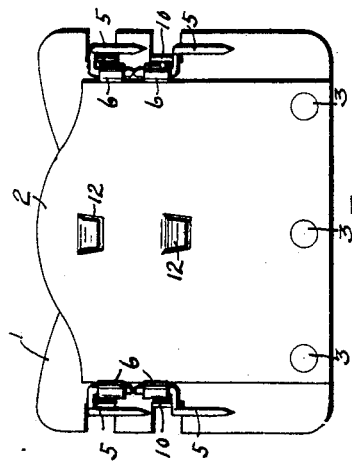
Figure 6:
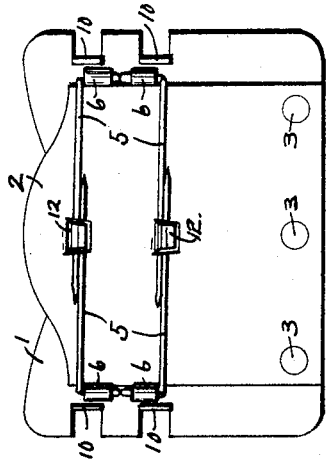
Figure 2:
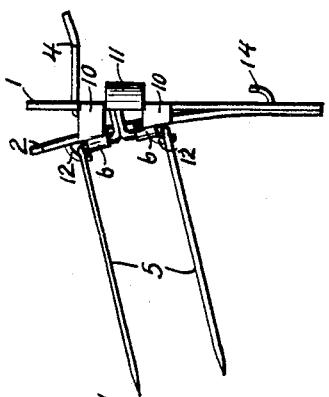
Figure 5:
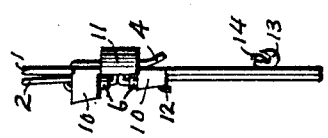
Figure 1:
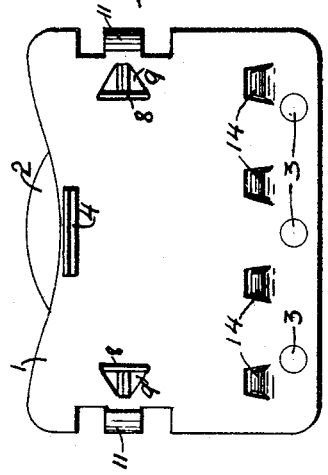
Figure 4:
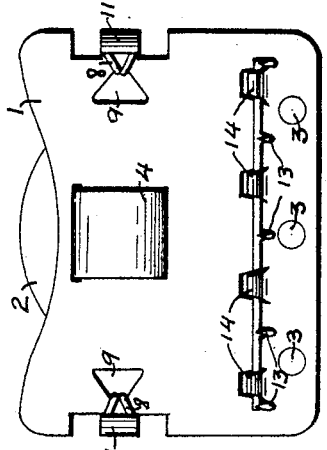

Figure 1 is a rear view of the rear plate when open ready to be attached to the waist.
Fig. 2 is a side view of the same, and Fig. 3 is a view of the front or the side worn next to the person. Fig. 4 is a rear view of the waist-plate as closed when fastened to the waist ready to receive the skirt. Fig. 5 is a side view, and Fig. 6 is a front view, of the same. Fig. 7 is a top view of Fig. 6, and Fig. 8 is a top view of Fig. 3. Fig. 9 is a view of the plate with a hooked serrated bottom edge. Fig. 10 is a side view of Fig. 9. Fig. 11 is a face view of the little fulcrum-lever whereby my invention is opened and closed. Fig. 11$^a$ is an edge view of the same. Fig. 12 represents a form of hook-pin to catch and support the skirt on the waist-pin. Fig. 13 is a view of the pivoted pins whereby the waist-plate is fastened to the waist. Fig. 14 is a view showing the application of the device in use.

Similar characters refer to similar parts in the several views.
My invention comprises two thin metallic plates 1 and 2, riveted together at 3 3 near the bottom edges. A similar metallic fulcrum-lever 4 is inserted through a suitable slot in the metallic plate 1. The metallic plates 1 and 2 being elastic spring closely together when the lever 4 is down, as shown in Figs. 5, 7, and 10, and when pulled up they are sprung apart at the top, as shown in Fig. 2. On the side edges of plate 2 are pivotally fastened two duplex swinging pins 5 5. Each of these duplex pins is made of one piece of steel wire, as shown in Fig. 13. Narrow extensions 6 6 of the edge of plate 2 are bent around the duplex pins at 7 7, thus securely hinging the pins thereto. The central part of duplex pins 5 5 is bent to form a triangular-shaped loop 8. Triangular-shaped holes 9 9 are cut through plate 1 near the side edges to receive the triangular loops 8 8. These triangular-shaped loops and holes are so adjusted and fitted to each other that when plates 1 and 2 are sprung open by the lever 4 the wide end of loop 8 will slide outwardly and into the corresponding wide side of the triangular opening 9, and thus cause the duplex pins to open out and stand at right angles with the plate 2, as shown in Figs. 2 and 8. It is to be observed that on the side edges of plate 1 are small extensions 10 10, bent at right angles therewith, which form a support to each of the duplex pins and relieve the strain on the angles and hinges of each when they are pushed into the garment. When the lever 4 is pushed down against plate 1, plate 2 springs back against plate 1, and these extensions 10 10 cause the duplex pins 5 5 to fold together against plate 2, as shown in Figs. 6 and 7. It is to be observed that the triangular loops 8 8 are now folded down flat against plate 1 and under a curved extension 11 11 of the edges of plate 1, and these help to hold the pins 5 5 to stay folded against plate 2. Centrally in plate 2 and immediately above the pins 5 5 are curved extensions 12 12, which are designed to resist the upward strain against the pins 5 5.

The foregoing description sets forth the device used to attach my invention to the waist and waist-clothes. The pins 5 5 are thrust through the clothing while extended, as in

Figs. 2, 3, and 8. The fulcrum-lever 4 is then pushed down and the pins fold together automatically, thus firmly attaching my device to the waist-clothes ready to have the skirt put on the person and attached thereto.

The skirt is supported on the waist-pin by means of a series of claw-shaped pins 13, as illustrated in Fig. 12. This multiple of claw-shaped pins is to be hung in or on the loops 14 14, cut from and formed in the plate 1, as shown in Figs. 1, 4, and 5. I do not limit myself to this exact form of pins for attaching the skirt-band to the waist-pin.

In Figs. 9 and 10 the waist-plate is made with a multiple of serrated hooks or claws 15, cut in the lower edge of plate 1 and upwardly bent to claw into, engage, and support the skirt when the waistband is adjusted to and fitted thereon.

It is to be understood that the device as above described is to be worn on the back of the waist to support the dress-skirt in the rear and is designed to do so without injury to the clothing and with comfort and security to the person.

In the construction of my invention I do not limit myself to sizes and proportions shown in the drawings, but contemplate varying the same to make it adaptable to garments of various sizes and weights as I may find most suitable and practicable, and, furthermore, I do not limit my invention to waist and skirt supporters alone; but it is my intention to use the same in connecting and fastening garments together wherever I can use the invention to advantage.

Having described my invention and set forth its merits, what I claim is—

1. A waist-pin and garment-supporter, comprising two metallic plates fastened together at their bottom edges, a fulcrum-lever suitably mounted in one of said plates to spring said plates apart at the top, duplex pins pivotally mounted on the side edges of one of said plates, and adapted to be opened and closed by said plates in springing apart and together, respectively, and means for attaching the skirt to said waist-pin, substantially as described and for the purposes set forth.

2. A waist-pin and skirt-supporter comprising two metallic plates fastened together at their bottom edges, a suitable lever for springing said plates apart at the top, one of said plates being provided with claw-hooks to engage and support the skirt, folding duplex pins pivotally mounted on the edge of one of said plates and each having a triangular-shaped loop, one of the plates being formed with similar-shaped openings to receive said loops to permit said pins to open out when said plates are sprung apart, and angular extensions at the edges of the opposite spring-plate to close said pins and hold them together and in place when fastened to the waist, substantially as described.

In testimony whereof I affix my signature in presence of two witnesses.

MARY E. KINTZ.

Witnesses:
 CORA F. KINTZ,
 JNO. D. FLETCHER.